(12) United States Patent
Eshraghi et al.

(10) Patent No.: US 7,648,665 B2
(45) Date of Patent: Jan. 19, 2010

(54) SUBSTRATE-SUPPORTED PROCESS FOR MANUFACTURING MICROFIBROUS FUEL CELLS

(75) Inventors: Ray R. Eshraghi, Cary, NC (US); Martin E. Ketterer, Apex, NC (US); Yongchao Si, Chapel Hill, NC (US)

(73) Assignee: Microcell Corporation, Raleigh, NC (US)

( * ) Notice: Subject to any disclaimer, the term of this patent is extended or adjusted under 35 U.S.C. 154(b) by 652 days.

(21) Appl. No.: 11/331,812

(22) Filed: Jan. 13, 2006

(65) Prior Publication Data
US 2006/0118994 A1    Jun. 8, 2006

Related U.S. Application Data

(62) Division of application No. 10/744,203, filed on Dec. 23, 2003, now Pat. No. 7,354,545.

(60) Provisional application No. 60/436,072, filed on Dec. 23, 2002, provisional application No. 60/457,903, filed on Mar. 27, 2003.

(51) Int. Cl.
*B29C 41/24* (2006.01)

(52) U.S. Cl. .................. 264/313; 264/166; 264/317; 264/343

(58) Field of Classification Search ............. 264/166, 264/313, 317, 343, 209.1
See application file for complete search history.

(56) References Cited

U.S. PATENT DOCUMENTS

| | | |
|---|---|---|
| 4,100,331 A | 7/1978 | Fletcher et al. |
| 4,107,354 A | 8/1978 | Wilkenloh et al. |
| 4,388,256 A | 6/1983 | Ishida et al. |
| 4,957,508 A | 9/1990 | Kaneko et al. |
| 5,171,735 A | 12/1992 | Chien |
| 5,209,883 A | 5/1993 | Chung et al. |
| 5,262,100 A | 11/1993 | Moore et al. |
| 5,529,855 A | 6/1996 | Watanabe |
| 5,916,505 A | 6/1999 | Cisar et al. |
| 5,916,514 A | 6/1999 | Eshraghi |
| 5,928,808 A | 7/1999 | Eshraghi |
| 5,989,300 A | 11/1999 | Eshraghi |
| 6,004,691 A | 12/1999 | Eshraghi |
| 6,113,722 A | 9/2000 | Hoffman et al. |

(Continued)

FOREIGN PATENT DOCUMENTS

CA    2243520 A1    7/1997

(Continued)

OTHER PUBLICATIONS

Unpublished U.S. Appl. No. 12/349,483.

*Primary Examiner*—Mathieu D. Vargot
(74) *Attorney, Agent, or Firm*—Steven J. Hultquist; Intellectual Property/Technology Law

(57) ABSTRACT

The present invention relates to a substrate-supported process for continuous and automated manufacturing of microfibrous fuel cells and other electrochemical cells. Specifically, a removable substrate layer is formed around an inner current collector, followed by sequentially coating multiple structure layers, such as the inner catalyst layer, the membrane separator, and the outer catalyst layer, over such removable substrate layer, and subsequent removing such removable substrate layer, so as to form a lumen around the inner current collector, to allow passage of fluid therethrough. The removable substrate layer preferably comprises a water-soluble polymer, such as polyvinyl pyrrolidone (PVP), polyvinyl alcohol (PVA), or polyethylene glycol (PEG).

8 Claims, 5 Drawing Sheets

U.S. PATENT DOCUMENTS

| | | |
|---|---|---|
| 6,261,432 B1 | 7/2001 | Huber et al. |
| 6,338,913 B1 | 1/2002 | Eshraghi |
| 6,399,232 B1 | 6/2002 | Eshraghi |
| 6,403,248 B1 | 6/2002 | Eshraghi |
| 6,403,517 B1 | 6/2002 | Eshraghi |
| 6,444,339 B1 | 9/2002 | Eshraghi |
| 6,455,156 B1 | 9/2002 | Tanaka et al. |
| 6,495,281 B1 | 12/2002 | Eshraghi |
| 7,354,545 B2 | 4/2008 | Eshraghi et al. |
| 7,422,813 B2 | 9/2008 | Eshraghi et al. |
| 2002/0082634 A1 | 6/2002 | Kammerer et al. |
| 2004/0005498 A1 | 1/2004 | Eshraghi |
| 2004/0058224 A1 | 3/2004 | Eshraghi et al. |

FOREIGN PATENT DOCUMENTS

| | | | |
|---|---|---|---|
| EP | 1 237 220 A2 | | 9/2002 |
| JP | 10-266015 | * | 10/1998 |
| WO | 9726225 A1 | | 7/1997 |
| WO | 0109414 A1 | | 2/2001 |
| WO | 0209212 A1 | | 1/2002 |

* cited by examiner

SUBSTRATE-SUPPORTED PROCESS FOR MANUFACTURING MICROFIBROUS FUEL CELLS

CROSS-REFERENCE TO RELATED APPLICATIONS

This application is a divisional of U.S. patent application Ser. No. 10/744,203, filed on Dec. 23, 2003, and now issued as U.S. Pat. No. 7,354,545 on Apr. 8, 2009, which in turn claims the benefit of priority to U.S. Provisional Patent Application No. 60/436,072, filed on Dec. 23, 2002 in the names of Ray R. Eshraghi et al. for "SUBSTRATE-SUPPORTED PROCESS FOR MANUFACTURING MICROFIBROUS FUEL CELLS" and the benefit of priority to U.S. Provisional Patent Application No. 60/457,903, filed on Mar. 27, 2003 in the names of Ray R. Eshraghi et al. for "PROCESS FOR MANUFACTURING HOLLOW FIBERS." The disclosures of all of said prior filed U.S. applications are hereby incorporated herein by reference in their respective entireties, for all purposes.

GOVERNMENT INTEREST

The U.S. government may have rights in the present invention, pursuant to Grant No. 70NANB1H3039 awarded by the Advanced Technology Program (ATP) of National Institute of Science and Technology (NIST).

BACKGROUND OF THE INVENTION

1. Field of the Invention

This invention relates to methods for fabricating microfibrous electrochemical cells, specifically fuel cells, by using a removable substrate material as a support for additional coatings thereon, while such removable substrate material is subsequently removed to create a lumen in the microfibrous fuel cells to allow passage of fluid.

2. Description of the Related Art

The microcell technology is described in U.S. Pat. Nos. 5,916,514; 5,928,808; 5,989,300; 6,004,691; 6,338,913; 6,399,232; 6,403,248; 6,403,517; 6,444,339; and 6,495,281, all to Ray R. Eshraghi. The microfibrous cell structure described in these patents comprises hollow fiber structures with which electrochemical cell components are associated.

The aforementioned Eshraghi patents specifically describe a microfibrous fuel cell, which has an inner current collector, a hollow fibrous membrane separator containing an electrolyte medium, an outer current collector, and an inner and outer electrocatalyst layer on the inner and outer surface of the membrane separator.

Such microfibrous fuel cell further comprises an elongated lumen within the hollow fibrous membrane separator, which provides a fluid path to allow the passage of either fuel (such as hydrogen or methanol) or oxidant (such as oxygen). The presence and clearance of such fluid path is essential for the microfibrous fuel cell to properly perform its energy-generating function properly.

Conventional methods for fabricating such microfibrous fuel cell with the required fluid path involves formation of a hollow fibrous membrane separator by extruding a membrane-forming polymer through an orifice of an extrusion mold referred to as "spinnerette," either before insertion of the inner current collector, or concurrently around the inner current collector. A liquid or gas is blown through a bore-forming tube located in the center of the extrusion orifice, so as to form a lumen within the fibrous membrane separator so formed. The inner diameter of the hollow fibrous membrane separator is slightly larger than the outer diameter of the inner current collector, therefore leaving a fluid path for passage of fluid fuel therethrough. For more details of such conventional methods, see the U.S. Pat. Nos. 5,916,514; 5,928,808; 5,989,300; and 6,004,691.

However, such conventionally methods depend on use of a liquid or a gas as a lumen-forming agent, which is a fluid and cannot provide sufficient support against deformation caused by external force during the manufacturing process. Therefore, the hollow fibrous membrane separators formed by such methods may suffer from flat spots, which refers to blockage of the lumen or the fluid path within specific sections of the membrane separators, due to deleterious external force applied to the membrane separators before the membrane separator wall becomes fully solidified.

There therefore is a continuing need in the art to provide easier and faster ways to produce microfibrous fuel cells, with little or no blockage of the required fluid path therewithin.

Moreover, the conventional methods for fabricating the microfibrous fuel cell form the inner electrocatalyst layer either simultaneously with the hollow fibrous membrane separator via co-extrusion, or after the hollow fibrous membrane separator has already been formed. The co-extrusion process is very complicated, and the inner electrocatalyst and the hollow fibrous membrane layers formed by such process are also subject to significant deformation, due to the fact that such co-extrusion process provides little or not support to the newly-formed inner electrocatalyst and hollow fibrous membrane layers before complete solidification thereof. Subsequent catalyzation of the hollow fibrous membrane separator is not only complicated, but also increases the risk of blocking the required fluid path within such hollow fibrous membrane separator during the catalyzation steps.

It is therefore an object of the present invention to provide a substrate-supported process for producing the microfibrous fuel cells, in which an inner electrocatalyst layer can be first formed on a removable substrate, and a membrane-forming material layer is formed on and supported by such inner electrocatalyst layer, wherein the removable substrate can be subsequently removed to form the required fluid path within the membrane-forming material layer. Such substrate-supported process provides structural support for both the inner electrocatalyst layer and the membrane-forming material layer before complete solidification thereof. It not only simplifies the overall manufacturing process, but also significantly improves the quality of the microfibrous fuel cells formed thereby.

Other objects and advantages of the present invention will be more fully apparent from the ensuing disclosure and appended claims.

SUMMARY OF THE INVENTION

The present invention in one aspect relates to a method for fabricating a microfibrous fuel cell structure, comprising at least the steps of:
(a) providing a fibrous substrate structure comprising at least one removable substrate material in solid phase;
(b) coating a layer of membrane-forming material over the fibrous substrate structure; and
(c) subsequently removing such removable substrate material, so as to form a hollow fibrous membrane separator having a bore side and a shell side,
wherein the microfibrous fuel cell structure comprises (1) an inner current collector, (2) an outer current collector, (3) the hollow fibrous membrane separator, wherein such hollow fibrous membrane separator comprises an electrolyte medium and is in electrical contact with the inner current collector at its bore side and the outer current collector at its shell side, and wherein the bore side of the hollow fibrous membrane separator further comprises a lumen allowing passage of fluid therethrough, (4) an inner electrocatalyst layer coating on the hollow fibrous membrane separator at its bore side, and (5) an outer electrocatalyst layer coating on the hollow fibrous membrane separator at its shell side.

The solid-phase removable substrate material of the present invention provides a solid-phase substrate of sufficient mechanical strength for the membrane-forming material layer coated thereon, so that such membrane-forming material layer can withstand external forces during the manufacturing process, when the membrane wall is not yet solidified. Such solid-phase removable substrate material is subsequently removed to form a lumen allowing passage of fluid therethrough. Since the solid-phase removable substrate material is removed only after solidification of the membrane wall, such lumen is well protected against deformation during the manufacturing process. The hollow fibrous membrane separator formed by the method of the present invention therefore contains a clear fluid path with few or no flat spots.

The term "solid phase" as used herein refers to the state of the material used, as being a non-liquid or a non-gaseous material at room temperature and under atmospheric pressure.

Another aspect of the present application relates to a method for fabricating a microfibrous fuel cell structure, comprising the steps of:
(a) providing an inner current collector of a microfibrous conformation;
(b) forming at least one layer of removable substrate material over the inner current collector;
(c) forming an inner electrocatalyst layer over such at least one layer of removable substrate material;
(d) forming a membrane-forming material layer over the inner electrocatalyst layer;
(e) forming an outer electrocatalyst layer over the membrane-forming material layer;
(f) removing such at least one layer of removable substrate material; and
(g) attaching an outer current collector to an outer surface of the outer electrocatalyst layer,
so as to form the microfibrous fuel cell structure, which comprises (1) the inner and outer current collectors, (2) the inner and outer electrocatalyst layers, and (3) an hollow fibrous membrane separator formed by the membrane-forming material layer, wherein the hollow fibrous membrane separator comprises an electrolyte medium and has a bore side and a shell side, with the inner current collector and the inner electrocatalyst layer at the bore side, and the outer current collector and the outer electrocatalyst layer at the shell side, and wherein the bore side of such hollow fibrous membrane separator further comprises a lumen, which is formed by removal of the removable substrate material, to allow passage of fluid therethrough.

The method described hereinabove significantly simplifies the manufacturing process for microfibrous fuel cells, which enables continuous and automated scale-up production of such microfibrous fuel cells.

Such method is not limited to production of microfibrous fuel cells. Instead, such substrate-supported method can be widely used for production of any microfibrous electrochemical cells, wherein a lumen is required for passage of fluid therethrough. Such microfibrous electrochemical cells include, but are not limited to, fuel cells, water electrolyzers, chloroalkali cells, etc.

Therefore, a still further aspect of the present invention relates to a method for fabricating a microfibrous electrochemical cell structure, comprising at least the steps of:
(a) providing a fibrous substrate structure comprising at least one removable substrate material in solid phase;
(b) coating a layer of membrane-forming material over the fibrous substrate structure; and
(c) subsequently removing such removable substrate material, so as to form a hollow fibrous membrane separator having a bore side and a shell side,
wherein the microfibrous electrochemical cell structure comprises (1) an inner electrode, (2) an outer electrode, (3) the hollow fibrous membrane separator, wherein such hollow fibrous membrane separator comprises an electrolyte medium and is in electrical contact with the inner electrode at its bore side and the outer electrode at its shell side, and wherein the bore side of the hollow fibrous membrane separator further comprises a lumen allowing passage of fluid therethrough.

Still another aspect of the present invention relates to a method for fabricating a microfibrous fuel cell structure, comprising at least the steps of:
(a) providing a core fiber comprising a solid material;
(b) forming at least one layer of a swellable polymeric membrane-forming material over the core fiber; and
(c) contacting such at least one layer of the swellable polymeric membrane-forming material with a swelling agent, so that the at least one-layer of the swellable polymeric membrane-forming material expands and detaches from the core fiber; and
(d) subsequently removing the detached core fiber, so as to form a hollow fibrous membrane separator having a bore side and a shell side,
wherein the microfibrous fuel cell structure comprises (1) an inner current collector, (2) an outer current collector, (3) the hollow fibrous membrane separator, wherein such hollow fibrous membrane separator comprises an electrolyte medium and is in electrical contact with the inner current collector at its bore side and the outer current collector at its shell side, and wherein the bore side of the hollow fibrous membrane separator further comprises a lumen allowing passage of fluid therethrough, (4) an inner electrocatalyst layer coating on the hollow fibrous membrane separator at its bore side, and (5) an outer electrocatalyst layer coating on the hollow fibrous membrane separator at its shell side.

The term "swellable polymeric membrane-forming material" as used herein refers to any polymeric membrane-forming material that undergoes volumetric expansion when being contacted with a swelling agent.

The term "swelling agent" as used herein refers to any liquid or gas that interacts with a polymeric membrane-forming material and causes such material to undergo volumetric expansion. Such swelling agent is preferably a liquid solvent, such as water or an organic solvent.

Yet a further aspect of the present invention relates to a method for fabricating a microfibrous fuel cell structure, comprising at least the steps of:
(a) providing a core fiber comprising a solid material;
(b) forming an inner electrocatalyst layer over such core fiber;
(c) forming at least one layer of a swellable polymeric membrane-forming material over the inner electrocatalyst layer;

(d) forming an outer electrocatalyst layer over such at least one layer of swellable polymeric membrane-forming material;

(e) contacting the swellable polymeric membrane-forming material layer with a swelling agent to effectuate expansion thereof, resulting in detachment of the core fiber from such swellable polymeric membrane-forming material layer as well as from the inner and outer electrocatalyst layers; and (f) subsequently removing the detached core fiber, so as to form a hollow fibrous membrane separator having a bore side and a shell side, with the inner electrocatalyst layer at its bore side and the outer electrocatalyst layer at its shell side, wherein the microfibrous fuel cell structure comprises (1) an inner current collector, (2) an outer current collector, (3) the hollow fibrous membrane separator, wherein such hollow fibrous membrane separator comprises an electrolyte medium and is in electrical contact with the inner current collector at its bore side and the outer current collector at its shell side, and wherein the bore side of the hollow fibrous membrane separator further comprises a lumen allowing passage of fluid therethrough, (4) the inner electrocatalyst layer, and (5) the outer electrocatalyst layer.

Other aspects, features and advantages of the invention will be more fully apparent from the ensuing disclosure and appended claims.

DETAILED DESCRIPTION OF THE INVENTION, AND PREFERRED EMBODIMENTS THEREOF

The disclosures of Eshraghi U.S. Pat. Nos. 5,916,514; 5,928,808; 5,989,300; 6,004,691; 6,338,913; 6,399,232; 6,403,248; 6,403,517; 6,444,339; and 6,495,281 as well as U.S. patent application Ser. Nos. 10/188,471 and 10/253,371 are incorporated herein by reference, in their respective entireties and for all purposes.

As used herein, the term "microfibrous" refers to a fibrous structure having a cross-sectional outer diameter in a range of from about 10 micron to about 10 millimeter, preferably from about 10 micron to about 5 millimeter, and more preferably from about 10 micron to about 1 millimeter.

The present invention utilizes a solid-phase removable substrate material, for forming a lumen inside a hollow fibrous membrane separator for a microfibrous fuel cell.

Figure 10:
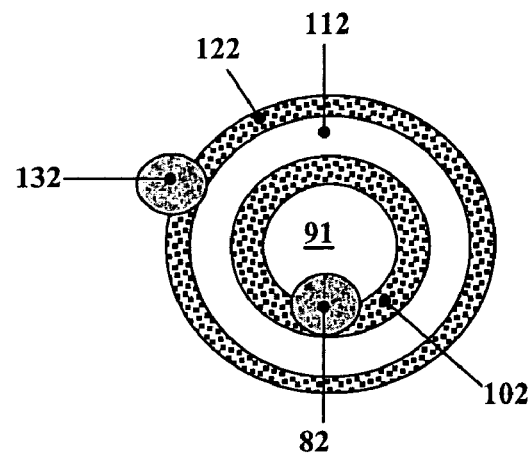
FIG. 10 is a cross-section view of a microfibrous fuel cell structure, formed by the method of the present invention.

FIG. 10 shows the basic components of a microfibrous fuel cell structure, which includes an inner current collector 82, an inner electrocatalyst layer 102, a hollow fibrous membrane separator 112 comprising an electrolyte medium (not shown), an outer electrocatalyst layer 122, and an outer current collector 132. The hollow fibrous membrane separator has a bore side and a shell side, wherein the bore side contains the inner current collector 82 and has the inner electrocatalyst layer 102 coated thereon, and wherein the shell side is in contact with the outer current collector 132 and has the outer electrocatalyst layer 122 coated thereon.

The hollow fibrous membrane separator comprises an electrolyte medium, which can be either a liquid electrolyte medium or a solid electrolyte medium. Preferably, such electrolyte medium is a solid material, such as an ion-exchange ceramic material or an ion-exchange polymeric material. More preferably, such electrolyte medium is a solid ion-exchange polymer (i.e., either a cationic exchange polymer or an anionic exchange polymer) selected from the group consisting of perflurocarbon-sulfonic-acid-based polymers, polysulfone-based polymers, perfluorocarboxylic-acid-based polymers, styrene-vinyl-benzene-sulfonic-acid-based polymers, and styrene-butadiene-based polymers. The hollow fibrous membrane separator may be microporous, with liquid or solid electrolyte medium impregnated in micropores of such membrane separator. More preferably, the hollow fibrous membrane separator is itself a solid ion-exchange membrane, which consists essentially of either a solid ion-exchange ceramic or a solid ion-exchange polymer and functions both as the membrane matrix for providing structural support and the electrolyte medium for carrying out the electrochemical reaction. Examples of such ion-exchange polymeric membrane include the Nafion® membrane manufactured by DuPont at Fayetteville, N.C.; the Flemion® membrane manufactured by Asahi Glass Company at Tokyo, Japan; the Aciplex® membrane manufactured by Asahi Chemical Company at Osaka, Japan; and the Dow XUS membrane produced by Dow Chemical at Midland, Mich.

The bore side of the hollow fibrous membrane separator further contains a lumen 91, which allows passage of fluid fuel (such as hydrogen and methanol) or oxidant (such as oxygen) therethrough. Such lumen 91 provides a fluid path that is essential for the microfibrous fuel cell to perform its energy-generating function, and blockage of such lumen 91 can deleteriously affect the power performance of such fuel cell.

The present invention therefore uses a solid-phase removable substrate material to initially occupy the space designed for such lumen 91, while a membrane-forming material layer is formed on top of and is supported by such solid-phase removable substrate material during various manufacturing steps such as coating/drying/curing. After the membrane-forming material layer is sufficiently solidified, such solid-phase substrate material is then selectively removed to form the hollow space or the lumen 91 within the hollow fibrous membrane separator 112.

The solid-phase removable substrate material of the present invention provides a solid core of high mechanical strength, which supports subsequent coating of additional layers of various materials thereon for formation of various components of the microfibrous fuel cell structure, as described hereinabove, and which preserves space for subsequent formation of a clear fluid path in such microfibrous fuel cell structure. The removable substrate material also provides additional cushioning for the membrane-forming material layer against potential breakage due to bending or twisting during the manufacturing process.

The removable substrate material of the present invention can be any suitable material that is in solid phase at room temperature and under the atmospheric pressure, such as metal, glass, ceramic, polymer, etc., provided that such material can be subsequent removed in a selective manner, i.e., by a method that does not remove the basic components or parts of the microfibrous fuel cell structure. For example, such removable substrate material can be a sublimable material, which is sublimable under sublimation conditions that do not affect the basic components of the microfibrous fuel cell structure, such as the inner and outer current collectors, the inner and outer electrocatalyst layers, and the hollow fibrous membrane separator; it can also be a meltable material, which melts under melting conditions that do not affect the basic components of the microfibrous fuel cell structure; and it can be a soluble material, which can be dissolved by a solvent that do not affect the basic components of the microfibrous fuel cell structure.

In a preferred embodiment of the present invention, such removable substrate material is a soluble material, such as acid-soluble material, alkali-soluble material, organic-solvent-solvent material, and water-soluble material.

In a more preferred embodiment of the present invention, such removable substrate material is a water-soluble polymeric material. Since water is a removal agent that is the least invasive to the basic components of the microfibrous fuel cell structure, use of a water-soluble polymeric material is particularly suitable for practice of the present invention. Moreover, use of water as a removal agent is both cost-effective and environmental-friendly.

The water-soluble polymer used for practicing the present invention can be any natural or synthetic polymeric material that is water-soluble and compatible with the materials subsequently coated on to the substrate structure. Examples of such water-soluble polymers include polyvinyl pyrrolidones, polyvinyl alcohols, polyethylene glycols, polyethylene oxides, acrylic acid type water soluble polymers, maleic anhydride type water soluble polymers, poly(N-vinyl amides), polyacrylamides, poly(ethyleneimine), poly(hydroxy-ethyl methacrylate), polyesters, poly(ethyl oxazolines), poly(oxymethylene), poly(vinyl methyl ether), poly(styrene sulfonic acid), poly(ethylene sulfonic acid), poly(vinyl phosphoric) acid, poly(maleic acid), starch, cellulose, protein, polysaccharide, dextrans, tannin, lignin, etc.

Such list of water-soluble polymers is only exemplary, and it is not intended to limit the broad scope of the present invention. Preferably, such water-soluble polymer is selected from polyvinyl pyrrolidone, polyvinyl alcohol, polyethylene glycol, and mixtures thereof. More preferably, such water-soluble polymer comprises polyvinyl pyrrolidone and/or polyvinyl alcohol.

Figure 1:
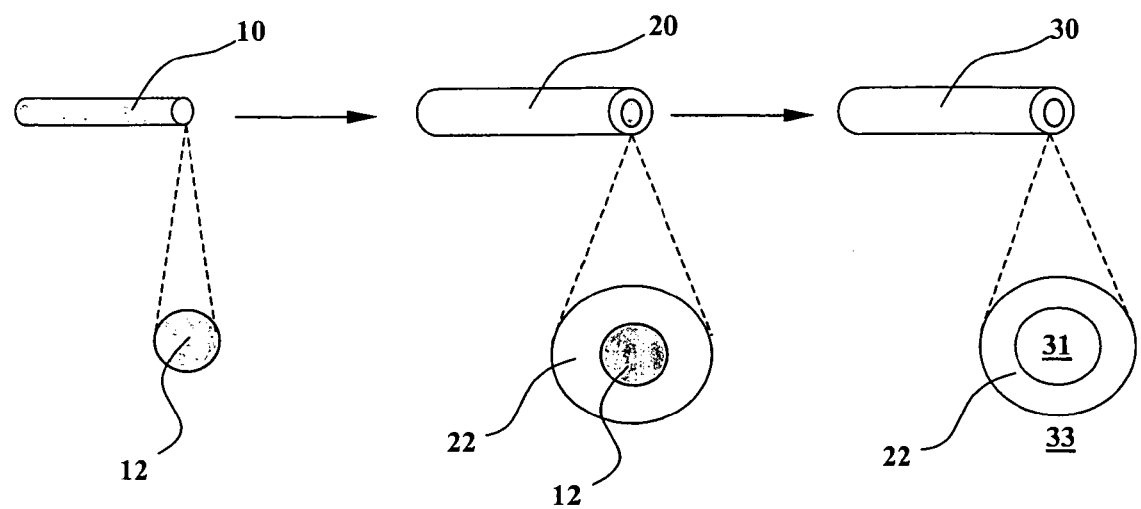
FIG. 1 is a perspective view of a process for producing a hollow fibrous membrane separator, according to one embodiment of the present invention.

FIG. 1 shows a fibrous substrate structure 10 consisting essentially of a water-soluble substrate material 12. The fibrous substrate structure 10 is then coated by a layer of membrane-forming material 22, so as to form a coated fiber 20. After solidification of the membrane-forming material 22, the water-soluble substrate material 12 is removed by immersing such coated fiber 20 in hot water, or by running hot water through the coated fiber 20, leaving only a shell of the membrane-forming material 22 with a lumen 31 therein, resulting in a hollow fibrous membrane separator 30.

The inner and outer current collectors can be subsequently attached to the hollow fibrous membrane separator 30, and the inner and outer electrocatalyst layers can be subsequently applied to the hollow fibrous membrane separator 30, simultaneously or in sequence, in any order or any combination. For example, the inner and outer current collectors can be simultaneously attached to the hollow fibrous membrane separator, followed by application of the inner electrocatalyst layer and then application of the outer electrocatalyst layer; alternatively, the inner and outer electrocatalyst layers can be simultaneously applied to the hollow fibrous membrane separator, followed by attachment of the inner and outer current collectors thereto. A person ordinarily skilled in the art can readily design and arrange a suitable protocol for manufacturing such microfibrous fuel cells, depending on specific material and system requirements.

Various methods for application of the inner and/or outer electrocatalyst layers have been described in U.S. patent application Ser. No. 10/253,371 filed on Sep. 24, 2002 for "MICROCELL FUEL CELLS, FUEL CELL ASSEMBLIES, AND METHODS OF MAKING THE SAME," the content of which is incorporated hereby by reference in its entirety for all purposes, to form a complete microfibrous fuel cell structure as described hereinabove.

Subsequent removal of the solid-phase removable substrate material is preferably, although not necessarily, facilitated by providing a removal interface, which is in contact with at least a portion of the removable substrate material. Such removal interface increases the active working surface of a removing agent, such as acid, alkali, organic solvent, or water, and therefore facilitates removal of the substrate material. Such removal interface is preferably an open cavity inside the removable substrate material, through which a removing fluid can be passed to remove the substrate material.

Figure 2A:
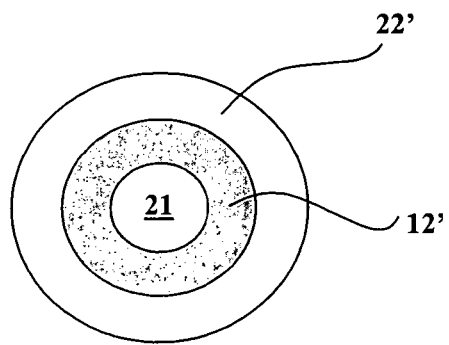
FIGS. 2A and 2B are cross-sectional views of two fibrous substrate structures of different embodiments, each of which is coated with a layer of membrane-forming material.
Figure 2B:
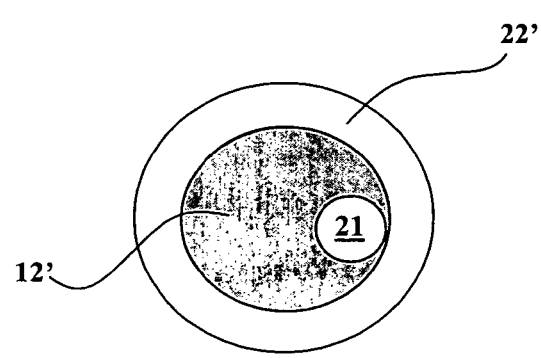

FIG. 2A shows the cross-sectional view of a coated fiber, having a fibrous substrate structure coated by a layer of membrane-forming material 22', wherein such fibrous substrate structure comprises an open cavity 21 inside of a removable substrate material 12'. The open cavity 21 is elongated, providing a path for a removing fluid, to facilitate removal of the substrate material 12'. The open cavity can be in the middle of the removable substrate 12', as shown in FIG. 2A, or near the outer surface of the removable substrate 12', as shown in FIG. 2B.

Figure 3:
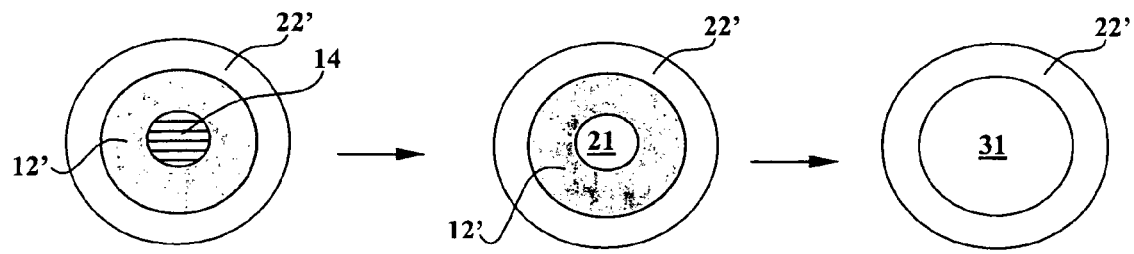
FIG. 3 is a cross-sectional view of a process for producing a hollow fibrous membrane separator, according to one embodiment of the present invention.

The removal interface mentioned hereinabove can be formed either ab initio, or subsequently formed. Specifically, such removal interface can be formed by using two or more removable substrate materials of different removability. FIG. 3 shows the process of forming a hollow fibrous membrane separator, using a fibrous substrate comprising two removable substrate materials 12' and 14' of different removability.

A first removable substrate material 14 (which can be either solid phase or non-solid-phase material) is coated by a second, solid-phase removable substrate material 12', and the first removable substrate material 14 is more readily removable than the second, solid-phase removable substrate material 12'. A layer of a membrane-forming material 22' is coated over the second, solid-phase removable substrate material 12' and solidifies thereon. After solidification of layer 22', the first removable substrate material 14 is first removed, leaving an open cavity 21 inside the second, solid-phase removable substrate material 12', through which a removing fluid can be passed to remove the second, solid-phase removable substrate material.

For example, such first removable substrate material 14 can comprise a low molecular weight, water-soluble polymeric material, and the second, solid-phase, removable substrate 12' can comprises a high molecular weight, water-soluble polymeric material. Alternatively, such first removable substrate material 14 can comprise a water-soluble polymeric material, and the second, solid-phase, removable substrate 12' can comprise a water-insoluble, acid-soluble glass material. Various combinations of materials can be used for constructing the fibrous substrate of two removable substrate materials of different removability. Such fibrous substrate can also comprise more than two removable substrate materials of different removability, as long as a solid-phase removable substrate material is provided at the outermost layer, to give structural support for subsequently applied coatings thereon.

It is important to note that the hollow micrifibrous membrane separator of the present invention can also be advantageously formed by using a swellable polymeric membrane-forming material, which includes any polymeric membrane-forming material that undergoes volumetric expansion when being contacted with a swelling agent. Suitable examples of swellable polymeric membrane-forming materials include ion-exchange polymers and perfluorosulfonic-acid-based polymers such as Nafion. The swelling agent used to effectuate the volumetric expansion of such polymeric membrane-forming material is preferably, but not necessarily, a liquid solvent, such as water or an organic solvent.

Such swellable polymeric membrane-forming material can be directly coated onto a solid core fiber, such as a metal wire or a carbon rod, dried and cured to form a solidified polymeric membrane, which is subsequently contacted with the swelling agent to undergo expansion and thereby detach from the solid core fiber. By pulling out or otherwise removing the detached solid core fiber, a hollow microfibrous polymeric membrane is formed, and subsequent processing steps can be taken to form a complete microfibrous fuel cell using such hollow microfibrous membrane.

In an alternative embodiment, an inner electrocatalyst layer, a swellable polymeric membrane-forming layer, and an outer electrocatalyst layer can be sequentially formed over the solid core fiber. The swelling agent is then contacted with these layers so as to effectuate expansion of the swellable polymeric membrane-forming layer, which in turn causes detachment of the solid core fiber from the polymeric membrane-forming layer as well as the inner and outer electrocatalyst layers. After the detached core fiber is removed, a hollow microfibrous membrane separator is formed, which defines a shell side and a bore side, with the inner electrocatalyst layer at its bore side and the outer electrocatalyst layer at its shell side.

An inner current collector having a diameter that is smaller than that of the removed solid core fiber can be inserted into the bore of such hollow microfibrous membrane separator, and an outer current collector can be placed at the shell side of such membrane separator, to form a complete microfibrous fuel cell.

Another embodiment of the present invention involves ab initio formation of a hollow fibrous membrane separator with an inner current collector therein, which avoids the step of subsequently inserting the inner current collector into the membrane separator and simplifies the overall manufacturing process.

Figure 4:
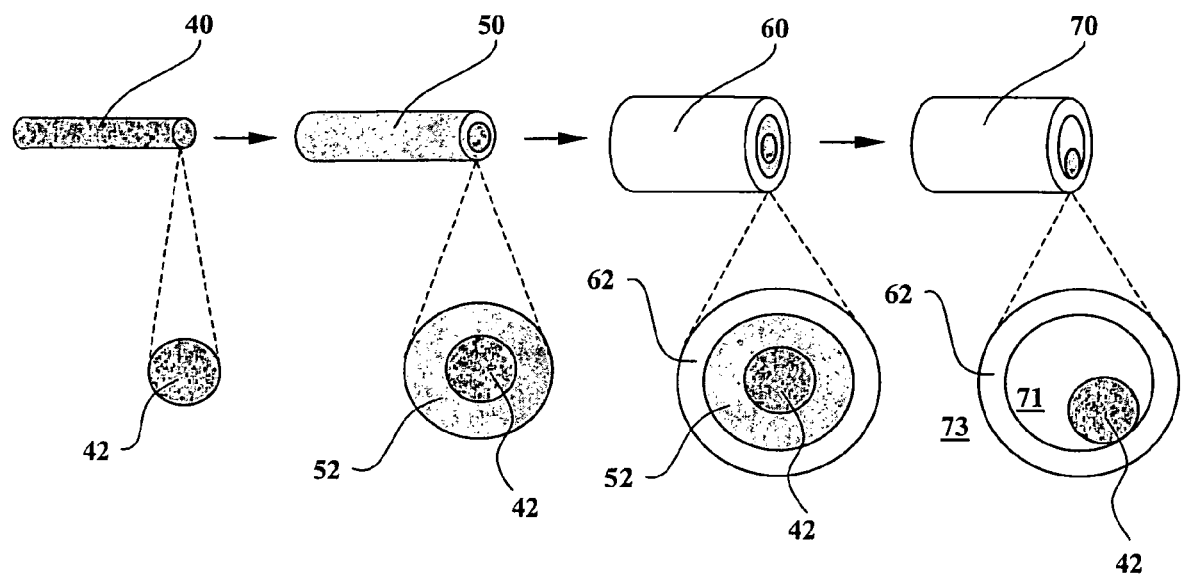
FIG. 4 is a perspective view of a process for producing a hollow fibrous membrane separator with an inner current collector therein, according to one embodiment of the present invention.

Specifically, a conductive fiber 40 is first provided, as in FIG. 4, which can function as the inner current collector. Such conductive fiber 40 comprises an electrically conductive material 42, which can be metal, metal alloy, carbon, or conductive polymers, etc. The conductive fiber 40 is coated with a layer of a removable substrate material 52, to form a fibrous substrate structure 50, onto which a layer of a membrane-forming material 62 is then coated. After solidification of the membrane-forming material 62, the coated fiber 60 is treated so as to remove the removable substrate material 52, forming a hollow fibrous membrane separator 70, with a lumen 71 therein, as well as the inner current collector 40.

An outer current collector can be subsequently attached to the hollow fibrous membrane separator 70, and an inner and an outer electrocatalyst layers can be applied thereto, simultaneously or in sequence, in any order or any combination, so as to form a complete microfibrous fuel cell structure, as described hereinabove.

Figure 5:
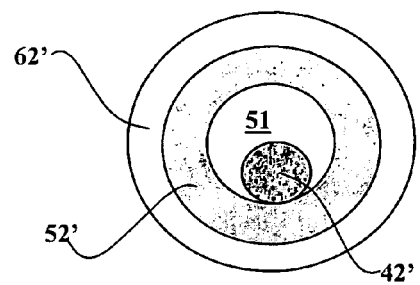
FIG. 5 is a cross-sectional view of a fibrous substrate structure coated with a layer of membrane-forming material, according to one embodiment of the present invention.

A removal interface as mentioned hereinabove could be provided adjacent to the inner current collector, to facilitate removal of the removable substrate material. For instance, FIG. 5 shows a coated fiber having a membrane-forming material layer 62' coated over a solid-phase removable substrate material 52', which contains an inner current collector 42' and a removal interface 51 therein. Such removal interface 51 is preferably an open cavity through which a removal fluid can be passed to effectively removing the substrate material 52'.

Figure 6:
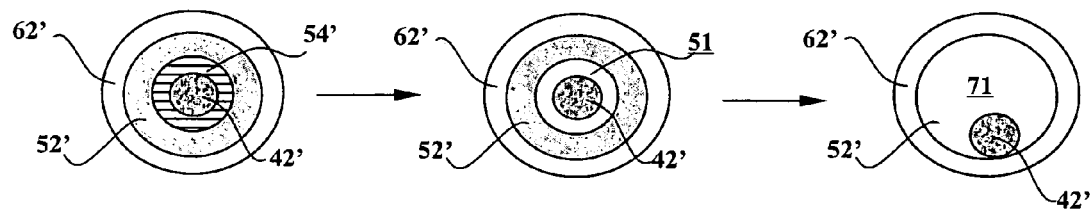
FIG. 6 is a cross-sectional view of a process for producing a hollow fibrous membrane separator with an inner current collector therein, according to one embodiment of the present invention.

FIG. 6 shows a coated fiber, according to an alternative embodiment of the present invention, which has a membrane-forming material layer 62' coated over a fibrous substrate structure that comprises, from inside out, an inner current collector 42', a first removable substrate material 54' (which can be either solid-phase or non-solid-phase), and a second, solid-phase removable substrate material 52'. The first removable substrate material 54' is more readily removable than the second, solid-phase removable substrate material 52', and is therefore first removed to form a removal interface 51. Removal of the second, solid-phase removable substrate material 52' is then carried out at such removal interface 51, forming a lumen 71 inside the membrane-forming material layer 62'. The fibrous substrate structure can comprise additional layers of removable substrate material of different removability, in addition to the example provided herein, as long as the outermost layer comprises a solid-phase substrate material.

Figure 7:
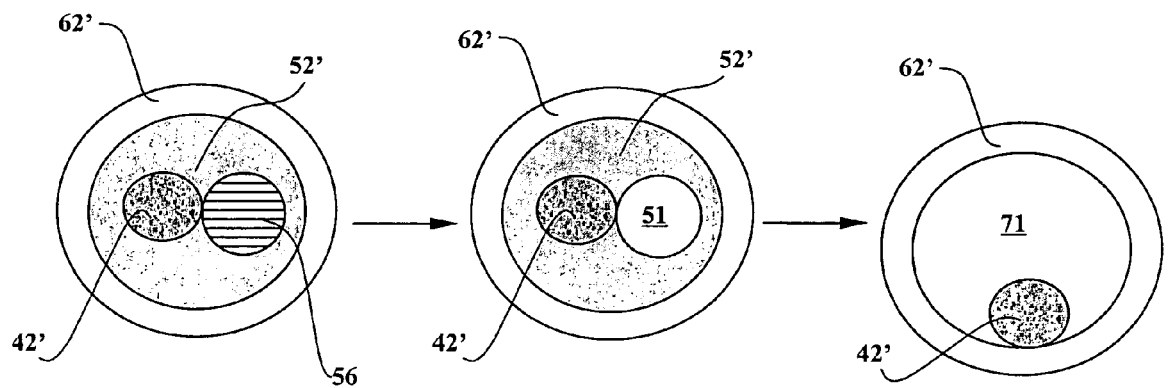
FIG. 7 is a cross-sectional view of a process for producing a hollow fibrous membrane separator with an inner current collector therein, according to another embodiment of the present invention.

FIG. 7 shows a coated fiber, according to a further alternative embodiment of the present invention, which has a membrane-forming material layer 62' coated over a fibrous substrate structure that comprises an inner current collector 42' laying side by side with a soluble fiber 56 and encapsulated by a solid-phase removable substrate material 52'. The soluble fiber 56 is first removed to provide a removal interface 51, and the solid-phase removable substrate material 52' is subsequently removed to produce a lumen 71. Formation of the removal interface 51 significantly increases the removal rate of the solid-phase removable substrate material 52' and is therefore preferred in the present invention.

Additional components of the microfibrous fuel cell structure, besides the inner current collector, can be formed ab initio with the hollow fibrous membrane separator, using the removable substrate material, as described hereafter.

Figure 8:
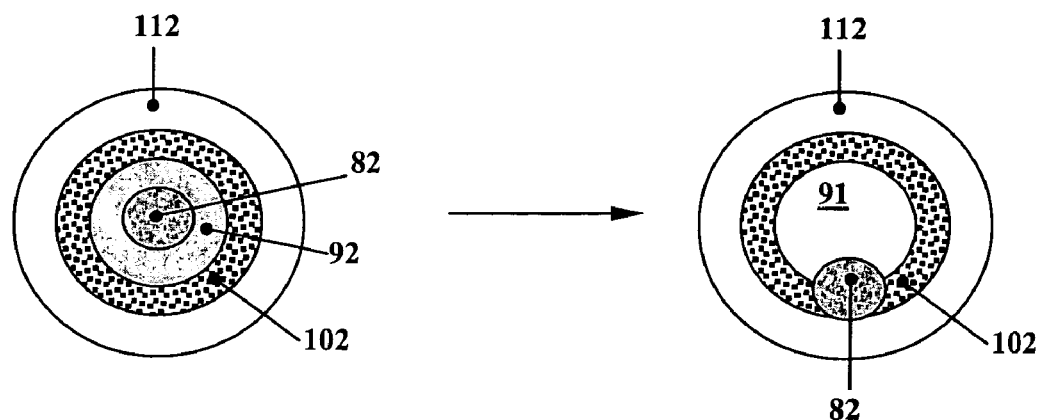
FIG. 8 is a cross-sectional view of a process for producing a hollow fibrous membrane separator with an inner current collector and an inner electrocatalyst layer therein, according to one embodiment of the present invention.

FIG. 8 shows the process for forming a hollow fibrous membrane separator with an inner current collector and an inner electrocatalyst layer formed therein ab initio. A coated fiber structure is first provided, which comprises a fibrous substrate structure and a membrane-forming material layer 112 over-coating such fibrous substrate structure. The fibrous substrate structure comprises, from inside out, an inner current collector 82, a removable substrate material layer 92, and an inner electrocatalyst layer 102. After the removal of the removable substrate material layer 92, a hollow fibrous membranes separator is formed by the membrane-forming material layer 112, which contains at its bore side an inner current collector 82, a lumen 91, and an inner electrocatalyst layer 102 coated on an inner surface of such hollow fibrous membrane separator.

Figure 9:
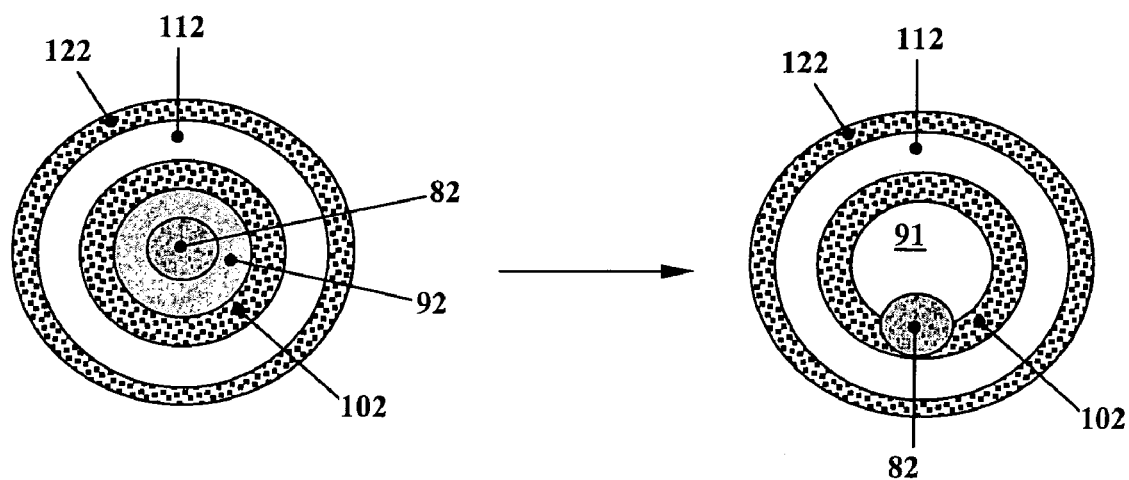
FIG. 9 is a cross-sectional view of a process for producing a hollow fibrous membrane separator with an inner current collector, an inner electrocatalyst layer, and an outer electrocatalyst layer, according to one embodiment of the present invention.

FIG. 9 shows the process for forming a hollow fibrous membrane separator with an inner current collector, and an inner and an outer electrocatalyst layers formed thereon ab initio. Specifically, a multiple-layer structure is provided, which comprises, from inside out, an inner current collector 82, a removable substrate material layer 92, an inner electrocatalyst layer 102, a membrane-forming material layer 112, and an outer electrocatalyst layer 122. After the removal of the removable substrate material layer 92, a hollow fibrous membrane separator is formed by the membrane-forming material layer 112, which contains at its bore side an inner current collector 82, a lumen 91, and an inner electrocatalyst layer 102, and at its shell side an outer electrocatalyst layer 122. An outer current collector can be subsequently attached to such hollow fibrous membrane separator, to form a complete microfibrous fuel cell structure, as described hereinabove.

By using the solid-phase removable substrate material of the present invention, the microfibrous fuel cell structure can be manufactured by a series of coating/treating/removing steps, which can be accomplished in a continuous, automated manner for scale-up commercial production of microfibrous fuel cells.

In a specific embodiment of the present invention, a microfibrous fuel cell structure can be formed by a series of continuous steps including:
 (a) providing an inner current collector of a microfibrous confirmation;
 (b) forming at least one layer of removable substrate material over the inner current collector;
 (c) forming an inner electrocatalyst layer over said at least one layer of removable substrate material;
 (d) forming a membrane-forming material layer over the inner electrocatalyst layer;
 (e) forming an outer electrocatalyst layer over the membrane-forming material layer;
 (f) removing said at least one layer of removable substrate material; and
 (g) attaching an outer current collector to an outer surface of the outer electrocatalyst layer.

The following sections describe each of the above-listed steps for fabricating such microfibrous fuel cell structure in detail:

Formation of the Removable Substrate Material Layer(S)

At least one layer of a removable substrate material is formed over the microfibrous inner current collector, which can be a conductive fiber of any suitable material, such as metal, metal alloys, carbon, and conductive polymers.

Any suitable method can be used to form such removable substrate material layer(s), including but not limited to melt extrusion, solution extrusion, ink extrusion, spray coating, brush coating, dip-coating, and vapor deposition.

A preferred method for forming the removable substrate material layer(s) over the inner current collector is melt extrusion, which includes the steps of: (i) providing a removable substrate material as molten; (ii) extruding the molten removable substrate material over the inner current collector, to form a layer of a desired thickness; (iii) cooling the formed layer for a sufficient period of time, so as to form a solidified layer of removable substrate material. Such steps can be repeated for multiple times to form multiple layer(s) of the same or different removable substrate material(s).

Melt extrusion is advantageous because the formed layer of the removable substrate material can be easily and quickly solidified by cooling, which is either carried out in the air, or in a liquid bath, provided that such liquid bath contains a liquid that does not significantly attack or remove the removable substrate material or the inner current collector. When the removable substrate material comprises a water-soluble polymer, such as polyvinyl pyrrolidone (PVP), polyvinyl alcohol (PVA), and polyethylene glycols (PEG), such liquid bath may comprise cold water, since most of the water-soluble polymers dissolve only in water at elevated temperatures in a range of from about 40° C. to about 100° C., but very little or none in cold water at lower temperatures.

Another preferred method for forming the removable substrate material layer(s) over the inner current collector is solution extrusion, which includes the steps of: (i) providing a viscous solution of a removable substrate material; (ii) extruding the viscous solution over the inner current, to form a layer of a desired thickness; and (iii) treating the formed layer of viscous solution for a sufficient period of time, so as to form a solidified layer of the removable substrate material.

The viscous solution of the removable substrate material can be formed by using any suitable solvent or solvents. For example, when the removable substrate material is a water-soluble polymeric material (i.e., PVP, PVA, or PEG), such viscous solution may be formed simply by using water as the solvent; when the removable substrate material is a polymeric material that is not soluble in water but is soluble in organic solvents, then such viscous solution may be formed by using a suitable organic solvent or solvent(s). Co-solvent or multi-solvent systems can be readily used in the present invention, depending on the specific types of removable substrate materials used.

The viscosity of such viscous solution needs to be controlled within an appropriate range, for example, from about 100 poises to about 2000 poises, as measured by rotational viscometry using a Brookfield rotating spindle viscometer. A solution that is too thick will not apply evenly over the surface of the inner current collector, and a solution that is too thin will not achieve a layer of sufficient thickness. Therefore, by controlling the viscosity of the removable substrate material solution, a layer of desired thickness can be evenly applied onto the inner current collector.

Solidification of the viscous solution of the removable substrate material can be achieved either by air-drying, or heat drying, or passing such through a coagulating bath, so as to drive the solvent out of such viscous solution and to solidify the layer of the removable substrate material.

Preferably, the viscous solution of the removable substrate material is provided at elevated temperatures during the extruding step, so that when it exits the extrusion die, the removable substrate material will immediately come out of the solution, due to the rapid drop in temperature, resulting in a semi-solid that requires minimal heating for driving off the remaining solvent. Such process is usually referred to as thermally induced phase separation process.

For removable substrate materials that do not form a solution easily (such as polytetrafluoroethylene), ink extrusion can also be used to form the removable substrate material layer(s) over the inner current collector, by providing a paste of such removable substrate material and extruding the paste onto the inner current collector.

Figure 11:
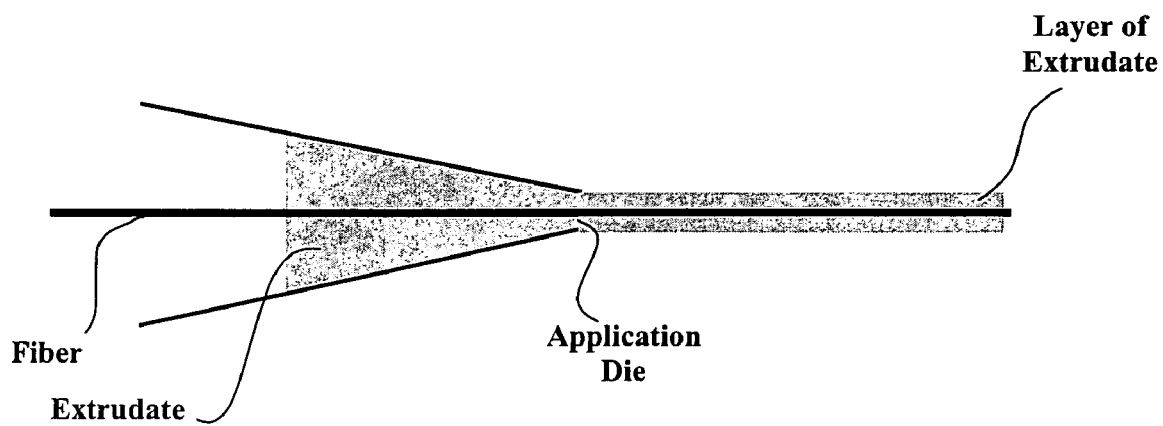
FIG. 11 is a perspective view of an extrusion process for applying an additional layer of material to a thin fiber.

In the present invention, the extrusion step is preferably achieved by pulling a fiber or a coated fiber through an application die filled with a molten material (as in melt extrusion), or a viscous solution (as in solution extrusion), or a ink paste (as in ink extrusion), to apply an additional layer of material (for instance, a layer of removable substrate material in this section, or a layer of electrocatalyst material in the next section) onto such fiber, as shown in FIG. 11. Such extrusion technique is a combination of wire coating and pultrusion, and can be used throughout this application for extruding an additional layer of material onto a thin fiber.

Formation of the Inner Electrocatalyst Layer

The inner and outer electrocatalyst layer can be formed either ab initio with the hollow fibrous membrane separator, or by subsequent catalyzation of the hollow fibrous membrane separator, according to various catalyzation methods disclosed in U.S. patent application Ser. No. 10/253,371 filed on Sep. 24, 2002 for "MICROCELL FUEL CELLS, FUEL CELL ASSEMBLIES, AND METHODS OF MAKING THE SAME," which is incorporated by reference herein.

The ab initio formation of the inner electrocatalyst layer can be achieved by various methods, including but not limited to, ink extrusion, spray-coating, brush-coating, dip-coating, chemical deposition, electrochemical deposition, and vapor deposition.

Ink extrusion is a preferred method for the ab initio formation of the inner electrocatalyst layer over the removable substrate material layer(s) in the present invention. Such ink extrusion method may include the steps of: (i) providing an ink paste comprising an electrocatalyst material; (ii) extruding the ink paste over the removable substrate material layer(s), to form a layer of desired thickness; and (iii) treating the ink paste for a sufficient period of time, so as to form a solidified electrocatalyst layer.

The electrocatalyst material may comprise a metal selected from the group consisting of platinum, gold, ruthenium, iridium, palladium, rhodium, nickel, iron, molybdenum, tungsten, niobium, and alloys thereof. Preferably, such electrocatalyst material comprises platinum or platinum alloys, such as platinum-ruthenium alloy, platinum-ruthenium-iron alloy, platinum-molybdenum alloy, platinum-chromium alloy, platinum-tin alloy, and platinum-nickel alloy.

The ink paste as used in the present invention may comprise at least an electrically conductive material (such as carbon powder or metal powder), the electrolyte, the electrocatalyst, and any other suitable performance-enhancing additives. Specifically, such ink paste may comprise, besides the electrocatalyst, carbon powder, an ion-exchange polymeric electrolyte material that is the same as that constituted by the hollow fibrous membrane separator, a polymeric binding material, and a solvent. The electrocatalyst material in such ink paste may vary from about 5% to about 90% based on total weight of such ink paste, and preferably from about 20% to about 60% based on total weight of the ink paste. Specifically, a catalyst slurry commercialized by Johnson Matthey, Inc. at Taylor, Mich. can be used for purpose of practicing the present invention, which comprises 20 w/% platinum-carbon powders and 5 w/% Nafion® binder in glycerol solution.

The ink paste can be treated, by either heat drying or contacting such ink paste with a coagulating agent, so as to form a solidified inner electrocatalyst layer.

Formation of the Membrane-Forming Material Layer

The membrane-forming material layer can be formed over the inner electrocatalyst layer, by methods similar to those for forming the removable substrate material layer, i.e., including but not limited to melt extrusion, solution extrusion, spray-coating, brush-coating, dip-coating, and vapor deposition.

A preferred method for forming such membrane-forming material layer is by solution extrusion, which includes the steps of: (i) providing a viscous solution of a membrane-forming material; (ii) extruding the viscous solution over the inner electrocatalyst layer, to form a layer of a desired thickness; and (iii) treating the layer of viscous solution for a sufficient period of time, to form a solidified membrane-forming material layer.

The viscous solution may contain from about 10% to about 50% of such membrane-forming material, based on total weight of the solution. Various solvents or solvent systems can be used to form such solution, depending on the specific kinds of membrane-forming material used. For example, when such membrane-forming material comprises perfluorosulfonate ionomer membrane materials, such as Nafion® (DuPont), Flemion® (Asahi Glass Company), Aciplex® (Asahi Chemical Company), and Dow XUS (Dow Chemical), a water-alcohol co-solvent system can be used to form the viscous solution of such membrane-forming material. Specifically, a Nafion® layer can be formed by pulling a coated fiber, which includes an inner current collector, a removable substrate material layer, and an inner electrocatalyst layer, through an applicator die filled with a 20-30 w/% Nafion® solution, so as to extrude a layer of the Nafion® solution onto the coated fiber.

The membrane-forming material layer can be subsequently solidified by heat drying, or by contacting such layer with a coagulating agent for enhanced solidification of the membrane-forming material layer. Preferably, such membrane-forming material is first cured at an elevated temperature, which is at least the glass transition temperature (Tg) of such membrane-forming material, and then cooled to form a solidified layer. More preferably, such material is cured at a temperature in a range of from about 100° C. to about 250° C., and most preferably in a range of from about 110° C. to about 150° C. The curing temperature can be readily modified, depending on the specific requirements for the formed membrane layer. Usually, the higher the curing temperature, the less water content in the membrane layer, and the stronger the membrane layer, but the trade off is that the membrane layer so formed is less ionic and therefore has a lower conductivity.

The hollow fibrous membrane formed by this step can be a solid membrane consisting essentially of a solid electrolyte material, such as an ion-conducting ceramic or polymer. Alternatively, such hollow fibrous membrane so formed may be microporous, having a solid electrolyte material impregnated in micropores thereof. Specifically, such hollow fibrous membrane may be microfiltration, ultrafiltration, or reverse osmosis membrane, as described in Eshraghi U.S. Pat. No. 5,916,514.

Formation of the Outer Electrocatalyst Layer

The formation of the outer electrocatalyst layer is carried out by methods substantially the same as those for forming the inner electrocatalyst layer, except that such outer electrocatalyst layer is formed on top of the membrane-forming material layer, while the inner electrocatalyst layer is formed on top of the removal substrate material layer. In order to enhance the structural integrity of the multi-layer fiber structure so formed, a soluble protective coating is preferably applied onto the outer electrocatalyst layer.

Removal of the Substrate Material

The removable of the substrate material depends on the specific removable substrate material used. Form example, if the removable substrate material is a sublimable material, then the removal will involve sublimation; if the removable substrate material is a meltable material, then the removal will involve melting; if the removable substrate material is a soluble material, then the removal will involve use of a solvent such as an acid, an alkali, an organic solvent, or water. Preferably, if the removable substrate material comprises a water-soluble polymer, the removal will then be carried out by immersing the multi-layer fiber structure in water for a sufficient period of time, or by running water through a bore of such multi-layer fiber structure, so as to remove a substantive portion of the removable substrate material. More preferably, the water is heated to an elevated temperature in a range of from about 40° C. to about 100° C., to enhance removal rate of the substrate material.

Note that complete removal of the removable substrate material is desired, but not required, during fabrication of the microfibrous fuel cells in the present invention. It is possible to remove only a portion of the substrate material at the time when individual microfibrous fuel cells are formed, bundle/seal multiple microfibrous fuel cells to form a module with a bore side and a shell side, and subsequently flow water through the bore side of such microfibrous fuel cell module to remove the remaining substrate material from the bores of the multiple microfibrous fuel cells in such module.

The various configurations of the removable substrate structure described hereinabove, comprising either a removal interface in contact with the substrate material, or two or more removable substrate materials of different removability, facilitates removal of the substrate material, and a person ordinarily skilled in the art can readily choose a suitable configuration adapted to specific system requirements, consistent with the disclosure herein.

Following are examples of various ink coatings that have been applied onto a fiber structure, for forming an inner or an outer electrocatalyst layer.

TABLE I

Inner Electrocatalyst Layer

| Substrate Material | Ink Composition | | | | | Resistance (ohms) | | Performance |
| | Binder (w %) | Carbon (w %) | Water (w %) | Glycerol (w %) | Platinum | Spacing <1/8" | Spacing ~1" | |
| --- | --- | --- | --- | --- | --- | --- | --- | --- |
| PVP | 25% Nafion | 1 | 5 | 20 | Yes | 500 | — | — |
| PVP | 25% Nafion | 1 | 2.5 | 10 | Yes | 150-200 | 800 | — |
| PVP | 25% Nafion | 1 | 2.5 | 5 | Yes | 50-100 | 250 | — |
| PVP | 10% Nafion 20% PVP | 1 | 2.5 | 5 | Yes | 60-70 | 150 for 1/2" | — |
| PVA | 10% Nafion 20% PVP | 1 | 2.5 | 5 | Yes | 50-70 | 250-300 | Open = 0.99 V and 20 mA/cm$^2$ (0.5 V) |
| PVA | 10% Nafion 20% PVP | 1 | 2.5 | 5 | Yes | 120-140 | >800 | Open = 0.89 V and 10 mA/cm$^2$ (0.5 V) |
| PVA | 10% Nafion 20% PVP | 1 | 2.5 | 5 | No | No reading | — | Open = 0.98 V and 10 mA/cm$^2$ (0.5 V) |
| PVA | 10% Nafion 20% PVP | 1 | 2.5 | 5 | No | 140-240 | 38000 | — |
| PVA | 10% Nafion 20% PVP | 1 | 5 | 0 | Yes | 50-60 | 1250 | — |
| PVA | 10% Nafion 20% PVP | 1 | 2.5 | 5 | Yes | 100-160 | 4400 | — |
| PVA | 10% Nafion 10% PVP | 1 | 5 | 0 | No | 30-40 | 850 | — |
| PVA | 10% Nafion 10% PVP | 1 | 2.5 | 5 | No | 300-3000 | 1000 | — |
| PVA | 10% Nafion 20% PVP | 1 | 2.5 | 5 | No | 50-170 | 2200 | — |

TABLE II

Outer Electrocatalyst Layer

| Ink Composition | | | | | Resistance (ohms) | | Performance |
| Binder (w %) | Carbon (w %) | Water (w %) | Glycerol (w %) | Platinum | Spacing <1/8" | Spacing ~1" | |
| --- | --- | --- | --- | --- | --- | --- | --- |
| 25% Nafion | 1 | 5 | 20 | Yes | 250 | 1200 | — |
| 25% Nafion | 1 | 5 | 20 | Yes | 220-250 | 1600 | — |
| 25% Nafion | 1 | 2.5 | 10 | Yes | 300-400 | >3000 | — |
| 25% Nafion | 1 | 2.5 | 10 | Yes | 300-400 | — | — |
| 25% Nafion | 1 | 2.5 | 5 | Yes | <110-130 | 700 | — |
| 25% Nafion | 1 | 2.5 | 5 | Yes | 50-120 | 550 | — |
| 25% Nafion | 1 | 2.5 | 5 | Yes | 65-200 | 600 | — |
| 25% Nafion | 1 | 2.5 | 5 | Yes | 80-200 | 700 | — |

In an alternative embodiment of the present invention, the ink paste applied to the bore and/or the shell side of the hollow fibrous membrane separator may or may not comprise electrocatalysts. For example, such ink paste may comprise no platinum catalyst, but only carbon or other conductive materials, such as niobium, titanium, titanium carbide, titanium nitride, niobium carbide, niobium nitride, etc. Catalyzation of the microfibrous fuel cell can be carried out after removal of the removable substrate material, or even later, i.e., after assembling of multiple microfibrous fuel cells into a bundle, according to the catalyzation methods disclosed in U.S. patent application Ser. No. 10/253,371 filed on Sep. 24, 2002 for "MICROCELL FUEL CELLS, FUEL CELL ASSEMBLES, AND METHODS OF MAKING THE SAME.

Further examples are provided hereinafter regarding fabrication of microfibrous fuel cell structures according to preferred embodiments of the present invention:

EXAMPLE 1

In the fabrication of the microfibrous fuel cell in this example, a 304-grade stainless steel wire having a diameter of 0.020" was provided as the inner current collector.

A removable polymer layer was formed over the inner current collector by extruding onto such inner current collector a polyvinyl pyrrolidone (PVP) solution (Luvitec K60, 45 wt %, as supplied by BASF Corporation), followed by drying.

The extrusion process conditions for the PVP 60 were:

| | |
|---|---|
| Line Speed: | 3 m/min |
| Extrusion Temperature: | ambient (approximately 72° F./22° C.) |
| Extrusion Rate: | 0.54 ml/min |
| Extrusion Die Orifice: | 0.053" |
| Extrusion Tip: | 0.023" × 0.032" hypo-tube |
| IR Dryer Length: | 1 m |
| IR Dryer Set Point: | 425° C. |

After drying, the fiber was collected on a spool. The cross-section of the fiber was examined under a microscope and measured with a micrometer, showing that such fiber has a PVP layer of approximately 50 to 60 microns and an outer diameter of approximately 600 to 617 microns.

A membrane layer was subsequently formed over such PVP 60-coated fiber, by extruding a Nafion 1100EW polymer solution (DuPont DE-2021) thereon.

Specifically, a concentrated solution of 31.5 wt % Nafion was prepared by evaporating a diluted 20 wt % Nafion (DuPont DE-2021). A first layer of the concentrated 31.5 wt % Nafion solution was extruded onto the PVP-coated current collector. The extrusion process conditions for the 31.5 wt % Nafion were:

| | |
|---|---|
| Line Speed: | 2 m/min |
| Extrusion Temperature: | ambient (approximately 72° F./22° C.) |
| Extrusion Rate: | 0.92 ml/min |
| Extrusion Die Orifice: | 0.034" |
| Extrusion Tip: | 0.027" |
| IR Dryer Length: | 1 m |
| IR Dryer Set Point: | 400° C. |

To ensure formation of a continuous, leak-free membrane, a second layer of concentrated 32 wt % Nafion solution was extruded over the first layer of the 31.5 wt % Nafion solution, under the following extrusion process conditions:

| | |
|---|---|
| Line Speed: | 1 m/min |
| Extrusion Temperature: | ambient (approximately 72° F./22° C.) |
| Extrusion Rate: | 0.48 ml/min |
| Extrusion Die Orifice: | 0.053" |
| Extrusion Tip: | 0.031" × 0.0355" hypo-tube |
| IR Dryer Length: | 1 m |
| IR Dryer Set Point: | 375° C. |

The Nafion-coated fiber was cut into desired lengths, dried at 70° C. for 30 minutes, and then heat-set at 125° C. for 1 hour. The cured fibers were subsequently placed in warm water for several hours to dissolve and remove the PVP 60 layer, so as to form a lumen inside the hollow microfibrous Nafion membrane layer for passage of liquid or gaseous fuel or oxidant, but without removing the inner current collector.

The inner and outer diameters of such hollow microfibrous Nafion membrane/inner current collector assembly so formed were about 570 and 760 microns, respectively, while the thickness of the Nafion membrane layer was approximately 85 to 95 microns.

A complete microfibrous fuel cell can then be fabricated using the above-described hollow microfibrous Nafion membrane/inner current collector assembly, by catalyzing the bore and shell sides of the Nafion membrane layer with platinum according to the catalyzation techniques disclosed in U.S. patent application Ser. No. 10/253,371, and then placing an outer current collector of 380 micron on the shell side of the catalyzed membrane.

The equipments used for producing the microfibrous fuel cell included:

Let-off stand for a wire spool

Single-layer extrusion die for applying the Nafion to the wire

Piston Pump

Medium wave Infrared dryer—1 meter long

Belted pulling unit to move the wire through the process

Take-up unit to collect the final product on a spool

EXAMPLE 2

A hollow microfibrous Nafion membrane/inner current collector assembly was fabricated by a process similar to that described in Example 1, except that the removable substrate was consisted of two removable polymeric layers, including a first removable layer of PVP 60, as described hereinabove in Example 1, and a second removable layer of polyvinyl alcohol PVA (Elvanol, grade 70-62, from DuPont).

An aqueous solution of PVA was prepared by gradually dissolving the PVA polymer in hot water with stirring. The PVA concentration of such solution was 13 wt %, which gave sufficient viscosity for the extrusion process. To ensure complete drying of the PVA layer, a second infrared unit was put in line. Process conditions for the PVA extrusion were:

| | |
|---|---|
| Line Speed: | 1 m/min |
| Extrusion Temperature: | ambient (approximately 72° F./22° C.) |
| Extrusion Rate: | 0.23 ml/min |
| Extrusion Die Orifice: | 0.034" |
| Extrusion Tip: | 0.032" |
| IR #1 Dryer Length: | 1 m |
| IR #1 Dryer Set Point: | 425° C. |

The thickness of the PVA layer so extruded was approximately 10 microns.

As in Example 1, two layers of concentrated Nafion solution were extruded onto to the PVP/PVA-coated fiber, which were subsequently cut to desired lengths and heat treated. The The process conditions for the above-described extrusion processes are outlined in the following Table III. Each of the extrusion steps were performed at an ambient temperature of approximately 72° F. (22° C.), and the drying was done with a medium wave infrared unit, 1 meter long.

TABLE III

| Material: | PVP 60 | Inner Bore ink | 32% Nafion 1$^{st}$ Layer | 32% Nafion 2$^{nd}$ Layer |
|---|---|---|---|---|
| Line Speed [m/min] | 3 | 1 | 1 | 1 |
| Extrusion Rate [ml/min] | 0.54 | 0.25 | 0.43 | 0.43 |
| Extrusion Die Orifice | 0.053" | 0.057" | 0.047" | 0.047" |
| Extrusion Tip ID | — | — | 0.039" | 0.039" |
| Sleeving Die ID × OD | 0.023" × 0.032" | 0.033" × 0.0425" | — | — |
| IR Dryer #1 Set Point [° C.] | 425 | 400 | 375 | 375 |
| Applicator for 20% Nafion | no | yes | no | no |
| IR Dryer #2 Set Point [° C.] | 400 | 375 | — | — |
| Layer Thickness [microns] | 50 μm | 20 μm | 50 μm | 50 μm | layer of PVP 60 was first removed with tepid water, so as to provide a removal interface to facilitate further removal of the PVA layer by using hot to boiling water.

The hollow microfibrous Nafion membrane/inner current collector assembly so formed had inner and outer diameters of 565 and 780 microns, respectively. A complete microfibrous fuel cell was formed by depositing an inner and an outer electrocatalyst layers on the inner and outer surfaces of the hollow microfibrous Nafion membrane, and by placing an outer current collector on the shell side of the catalyzed Nafion membrane, as described in Example 1.

EXAMPLE 3

A microfibrous fuel cell was prepared as follows:

A removable layer of polyvinyl pyrrolidone (PVP) was first formed by extruding a 45% Luvitec K60 PVP solution (supplied by BASF Corporation) around a titanium wire. An inner electrocatalyst layer was then applied onto the PVP-coated wire via ink extrusion. Two membrane-forming layers of concentrated 32 wt % Nafion solution were sequentially extruded over such inner electrocatalyst layer.

Specifically, the 32 wt % concentrated Nafion was obtained by evaporating a diluted Nafion solution that contained 20 wt % Nafion 1100EW (from Solution Technology, Inc.) in a mixture of alcohols and water. The concentrated Nafion solution had a viscosity of 890 poises, as measured by a rotational viscometer (Brookfield LVT model) with a #4 spindle at 6 rpm.

The catalyst ink used for forming the inner electrocatalyst layer was prepared by blending:

| Material | % weight |
|---|---|
| Platinum black (HiSpec 1000 from Alfa Aesar) | 16.0 |
| Deionized water | 3.5 |
| 5% aqueous Nafion solution (from Solution Technology, Inc.) | 56.5 |
| 3% polyacrylic acid | 24.0 |

The 3% polyacrylic acid was 4 million Mw (weight averaged molecular weight) dissolved in 5% alcohol-based Nafion. The viscosity of such catalyst ink was about 9 poises, as measured by a Brookfield LVT rotational viscometer with the #4 spindle at 60 rpm.

The outer diameter of the multi-layer assembly so formed was approximately 800 to 810 microns.

Such multi-layer assembly was then cut into desired lengths. An outer electrocatalyst layer was formed over the Nafion membrane layer ink, by brushing a catalyst ink paste thereonto. Specifically, the catalyst ink for forming such outer electrocatalyst layer was prepared by blending the following materials:

| Material | % weight |
|---|---|
| Platinum black (HiSpec 1000 from Alfa Aesar) | 18.8 |
| Deionized water | 13.8 |
| 5% alcohol based Nafion solution (Solution Technology, Inc.) | 66.3 |
| Polytetrafluoroethylene powder (1 micron particle size, Aldrich Chemical Company) | 1.1 |

The catalyst ink paste was dried in an air-circulating oven at 70° C. for 30 minutes, and then at 125° C. for 1 hour.

The multi-layered fibers were then placed in water with sufficient time to dissolve and remove the PVP layer, so as to release the Nafion membrane layer and to form a lumen inside the Nafion membrane layer for passage of liquid or gaseous fuel or oxidant, but without removing the titanium wire (i.e., the inner current collector) therein.

A complete microfibrous fuel cell was finally formed by placing an outer current collector at the shell side of the released and catalyzed Nafion membrane/inner current collector fibrous assembly.

EXAMPLE 4

In this Example, the microfibrous fuel cell was formed by steps similar to those described in Example 3, except that a different catalyst ink was used for forming the outer electrocatalyst layer, and that an additional thin protective layer of PVP (Luvitec K60) was applied over the outer electrocatalyst layer to protect such layer when passing the fibrous assembly through the Puller and the Take-up unit.

Specifically, the catalyzed ink used for forming the outer electrocatalyst layer was prepared by blending the following materials:

| Material | % weight |
|---|---|
| Platinum black (HiSpec 1000 from Alfa Aesar) | 16.2 |
| Deionized water | 34.0 |
| 5% aqueous based Nafion solution (Solution Technology, Inc.) | 26.4 |
| 20% alcohol based Nafion solution (Solution Technology, Inc.) | 7.6 |
| 5% Polyethylene oxide in deionized water (600k Mw, Aldrich Chemical Company) | 9.0 |
| 2% Polyethylene oxide in deionized water (8 million Mw, Aldrich Chemical Company) | 5.7 |
| Pure Triton Surfactant (Triton X-100, Aldrich Chemical Company) | 1.1 |

The viscosity of this catalyzed ink was approximately 9 poises, as measured by a Brookfield LVT rotational viscometer with the #4 spindle at 60 rpm.

The protective PVP layer was formed by extruding an aqueous PVP solution of 40 wt % PVP over the outer electrocatalyst layer.

Process conditions for extruding the outer electrocatalyst layer and the protective PVP layer were:

| | |
|---|---|
| Line Speed [m/min] | 1 |
| Extrusion Rate [ml/min] | 0.25 |
| Extrusion Die Hole | 0.047" |
| Extrusion Tip ID | 0.425" |
| IR Dryer #1 Set Point [° C.] | 400 |
| Applicator for 40% PVP | yes |
| IR Dryer #2 Set Point [° C.] | 375 |
| Layer Thickness [microns] | ~20 |

The protective PVP layer was removed during the subsequent post-extrusion steps, in which the removable PVP substrate was selectively removed (as described in Example 3) to form a lumen inside the hollow microfibrous Nafion membrane for passage of the hydrogen fuel or air.

EXAMPLE 5

A 304-grade stainless steel wire with a diameter of 0.020" was provided, and a swellable Nafion membrane layer was formed thereover by using a Nafion 1100EW polymer solution (supplied by Solution Technology, Inc.).

Specifically, a concentrated 32 wt % Nafion solution was obtained by evaporating a diluted Nafion solution that contained 20 wt % Nafion 1100EW in a mixture of alcohols and water. The concentrated 32 wt % Nafion solution had a viscosity of 890 poises, as measured by a rotational viscometer (Brookfield LVT model) with a #4 spindle at 6 rpm.

Such 32 wt % Nafion solution was extruded onto the stainless steel wire in a continuous, automated fashion by using a piston type pump. The Nafion coated wire was then passed through a medium wave Infra-red dryer for drying and curing the Nafion membrane layer.

The extrusion process conditions were:

| | |
|---|---|
| Line Speed: | 1 m/min |
| Extrusion Temperature: | ambient (approximately 72° F./22° C.) |
| Extrusion Rate: | 0.43 ml/min |
| Extrusion Die Hole: | 0.053" |
| Extrusion Tip: | 0.026" × 0.0355" hypo-tube |

-continued

| | |
|---|---|
| IR Dryer Length: | 1 m |
| IR Dryer Set Point: | 375° C. |

After drying, the thickness of the resulted Nafion membrane layer was approximately 40 to 50 microns. The Nafion-coated fiber was then passed through the belted puller to a take-up unit, which wound the fiber onto a spool.

The Nafion-coated fiber was then cut into desired lengths, dried in at 70° C. for 30 minutes, and then heat-set at 125° C. for 1 hour. These Nafion-coated fibers were then placed in water with sufficient time to allow the Nafion membrane layer to swell and thereby become detached from the stainless steel wire. The 0.020" stainless steel wire was removed to form a hollow microfibrous Nafion membrane having an inner diameter and an outer diameter of 520 and 600 microns, respectively.

A complete microfibrous fuel cell can then be fabricated using the above-described hollow microfibrous Nafion membrane, by catalyzing the bore and shell sides of the membrane with platinum catalyst, according to the catalyzation techniques disclosed in U.S. patent application Ser. No. 10/253,371, and by placing a 380 micron current collector at each of the bore and the shell sides of the catalyzed Nafion membrane.

The equipments used for producing the microfibrous fuel cell include:
- Let-off stand for the wire spool
- Single-layer extrusion die for applying the Nafion to the wire
- Piston Pump
- Medium wave Infrared dryer—1 meter long
- Belted pulling unit to move the wire through the process
- Take-up unit to collect the final product on a spool

EXAMPLE 6

In the fabrication of the microfibrous fuel cell of this example, the materials used include:
- a titanium wire with a 0.020" diameter
- a catalyst ink paste for forming the inner electrocatalyst layer
- a 20 weight % Nafion (DuPont DE-2021) solution
- a concentrated 32 wt % Nafion solution
- a catalyst ink paste for forming the outer electrocatalyst layer The equipments used for producing the microfibrous fuel cell include:
- a let-off stand for the wire spool
- a single-layer extrusion die for extruding the catalyst ink paste
- a piston pump
- an infrared dryer
- a coating die to apply a thin layer of the 20 wt % Nafion solution over the ink
- a hot air drying chamber
- a second extrusion coating die for applying the concentrated 32 wt % Nafion solution
- a second infrared drying oven
- a belted pulling unit to move the wire through the process
- a take-up unit to collect the final product on a spool The catalyst ink paste for forming the inner electrocatalyst layer was prepared by blending:
- 20.5% by weight platinum black (HiSpec 1000 from Alfa Aesar)

73% of a 5% aqueous Nafion solution (from Solution Technology, Inc.)

5% of a 5% solution of polyethylene oxide in deionized water (600,000 Mw PEO supplied by Aldrich Chemical Company, Inc.)

1.5% Pure Triton Surfactant (Triton X-100 by Aldrich Chemical Company, Inc.)

The viscosity of such ink paste was 22 poises, as measured by a Brookfield LVT rotational viscometer with the #4 spindle at 60 rpm.

The concentrated 32 wt % Nafion solution was obtained by evaporating the 20 wt % Nafion 1100EW solution obtained from Solution Technology, Inc. Such concentrated Nafion solution had a viscosity of 890 poises, as measured by a rotational viscometer (Brookfield LVT model) with a #4 spindle at 6 rpm.

The catalyst ink paste used for forming the outer electrocatalyst layer was prepared by blending:

18.8% by weight platinum black (HiSpec 1000 from Alfa Aesar)

13.8% deionized water 1.1% polytetrafluoroethylene powder with 1 micron particle size (supplied by Aldrich Chemical Company, Inc.)

66.3% of a 5% Nafion (in a mixture of alcohols and water) 1100 EW solution (Solution Technology, Inc.)

Line speed of the process described above was 1 m/min, and extrusion temperature was at ambient conditions (approximately 72° F./22° C.). The extrusion rate through the single-layer coating die for forming the inner electrocatalyst layer was 0.15 ml/min. The set point for the infrared drying unit for the ink layer was 400° C. After exiting the dryer, the catalyst-coated fiber was passed through a coating die filled with the 20 wt % Nafion solution, so as to apply a thin layer of 20 wt % Nafion solution over the inner electrocatalyst layer. This thin Nafion layer was dried by passing through a hot air tube, where heated air was supplied at 100-110° C. The thin layer of 20 wt % Nafion solution was used to improve adhesion between the inner electrocatalyst layer and the next layer of concentrated 32 wt % Nafion.

After exiting the hot air dryer, a second single-layer coating die was used to apply the concentrated 32% Nafion solution, which was pumped at a rate of 0.48 ml/min. The second Nafion layer was dried in an infrared dryer at 375° C. The Nafion-coated fiber was then passed through the belted puller to a take-up unit, which wound the fiberf onto a spool. Such Nafion-coated fiber at this point consisted of the 0.020" wire, an inner electrocatalyst layer of 10 to 15 microns, and a Nafion membrane layer of about 50 microns.

Such Nafion-coated fiber was cut into desired lengths, and an outer electrocatalyst layer was formed by brushing a catalyst ink paste onto the Nafion membrane layer. The catalyst ink was dried in at 70° C. for 30 minutes, and then at 125° C. for 1 hour. These multi-layer fibers were then placed in water with sufficient time to allow the Nafion membrane layer to swell, thereby separating the 0.020" wire from the Nafion membrane layer as well as the inner and outer electrocatalyst layers. The detached 0.020" wire was then removed therefrom, forming hollow fibers comprising a hollow microfibrous Nafion membrane, an inner electrocatalyst layer, and an outer electrocatalyst layer. The hollow fibers were then placed in warm dilute peroxide solution for 1 hour to remove impurities, then in 1N sulfuric acid overnight to restore all exchangeable sites into the H$^+$ form, and finally cleaned with deionized water and dried at 70° C. for 10 minutes.

Subsequently, a 0.015" diameter titanium/copper clad wire (i.e., the inner current collector), as disclosed in U.S. patent application Ser. No. 10/188,471 filed Jul. 2, 2002 and the content of which is incorporated herein by reference in its entirety for all purposes, was inserted into each of the hollow fibers, leaving a 0.005 passage between such inner current collector and the inner electrocatalyst layer. An outer current collector was secured to the outer surface of each of the hollow fibers by a fine titanium wire wrapped therearound, so as form complete microfibrous fuel cells.

The current density of one of such microfibrous fuel cells, which is about 6" long with a 3 cm$^2$ surface area, was tested at ambient conditions. Dry hydrogen was fed to the shell side, and air was fed to the bore side of such microfibrous fuel cell, both at a rate of 20 cc/min. Current density was approximately 135 to 140 mA/cm$^2$ at 0.5 volts. At 0.4 volts, the current density was 215 to 220 mA/cm$^2$.

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the invention.

What is claimed is:

1. A method for fabricating a microfibrous fuel cell structure, comprising the steps of:
    (a) providing a core fiber comprising a solid material;
    (b) forming at least one layer of a swellable polymeric membrane-forming material over said core fiber; and
    (c) contacting said at least one layer of the swellable polymeric membrane-forming material with a swelling agent, so that the at least one layer of the swellable polymeric membrane-forming material expands and detaches from the core fiber; and
    (d) subsequently removing the detached core fiber, so as to form a hollow fibrous membrane separator having a bore side and a shell side, wherein the microfibrous fuel cell structure comprises (1) an inner current collector, (2) an outer current collector, (3) the hollow fibrous membrane separator, wherein said hollow fibrous membrane separator comprises an electrolyte medium and is in electrical contact with the inner current collector at its bore side and the outer current collector at its shell side, and wherein the bore side of the hollow fibrous membrane separator further comprises a lumen allowing passage of fluid therethrough, (4) an inner electrocatalyst layer coating on the hollow fibrous membrane separator at its bore side, and (5) an outer electrocatalyst layer coating on the hollow fibrous membrane separator at its shell side.

2. The method of claim 1, wherein said swellable polymeric membrane-forming material comprises a proton-exchange polymer.

3. The method of claim 1, wherein said swellable polymeric membrane-forming material comprises a perfluorosulfonic-acid-based polymer.

4. The method of claim 3, wherein the swelling agent comprises water and/or an organic solvent.

5. A method for fabricating a microfibrous fuel cell structure, comprising the steps of:
    (a) providing a core fiber comprising a solid material;
    (b) forming an inner electrocatalyst layer over said core fiber;
    (c) forming at least one layer of a swellable polymeric membrane-forming material over the inner electrocatalyst layer;
    (d) forming an outer electrocatalyst layer over said at least one layer of swellable polymeric membrane-forming material;

(e) contacting the swellable polymeric membrane-forming material layer with a swelling agent to effectuate expansion thereof, resulting in detachment of the core fiber from said swellable polymeric membrane-forming membrane layer as well as from the inner and outer electrocatalyst layers; and (f) subsequently removing the detached core fiber, so as to form a hollow fibrous membrane separator having a bore side and a shell side, with the inner electrocatalyst layer at its bore side and the outer electrocatalyst layer at its shell side, wherein the microfibrous fuel cell structure comprises (1) an inner current collector, (2) an outer current collector, (3) the hollow fibrous membrane separator, wherein said hollow fibrous membrane separator comprises an electrolyte medium and is in electrical contact with the inner current collector at its bore side and the outer current collector at its shell side, and wherein the bore side of the hollow fibrous membrane separator further comprises a lumen allowing passage of fluid therethrough, (4) the inner electrocatalyst layer, and (5) the outer electrocatalyst layer.

6. The method of claim 5, wherein said swellable polymeric membrane-forming material comprises a proton-exchange polymer.

7. The method of claim 5, wherein said swellable polymeric membrane-forming material comprises a perfluorosulfonic-acid-based polymer.

8. The method of claim 7, wherein the swelling agent comprises water and/or an organic solvent.

* * * * *